Sept. 5, 1939.  J. D. NIXON  2,171,812
MEANS FOR INTERMITTENT FLUID CONTROL DEVICES
Original Filed Dec. 21, 1933   6 Sheets-Sheet 2

Inventor
Jeddy D. Nixon
By Jack Ashley
Attorney

Sept. 5, 1939.  J. D. NIXON  2,171,812
MEANS FOR INTERMITTENT FLUID CONTROL DEVICES
Original Filed Dec. 21, 1933  6 Sheets—Sheet 3

Inventor
Jeddy D. Nixon
By Jack Ashley
Attorney

Inventor
Jeddy D. Nixon
By Jack Athley
Attorney

Sept. 5, 1939.   J. D. NIXON   2,171,812
MEANS FOR INTERMITTENT FLUID CONTROL DEVICES
Original Filed Dec. 21, 1933   6 Sheets—Sheet 5
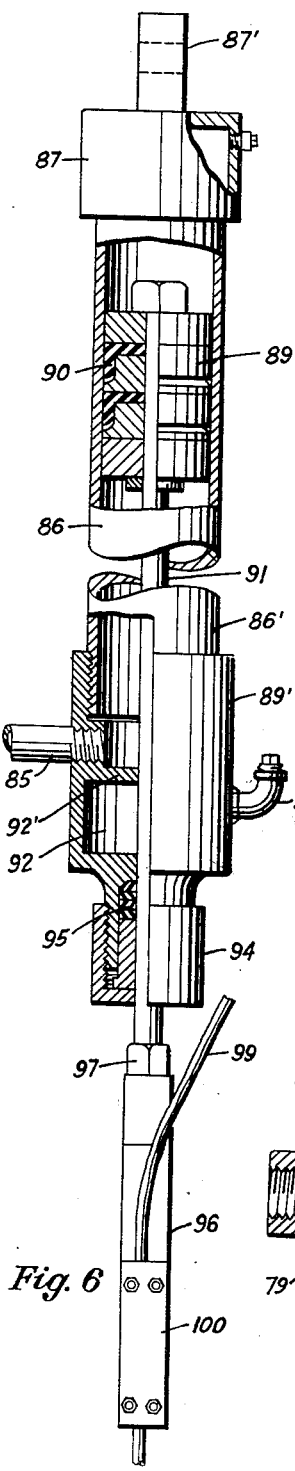
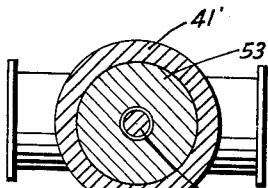
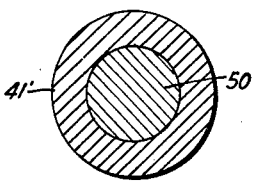
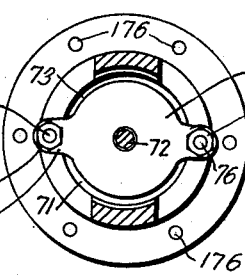
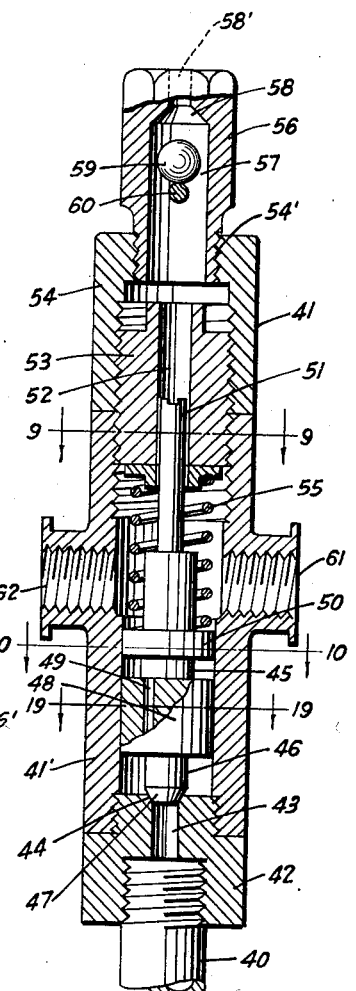
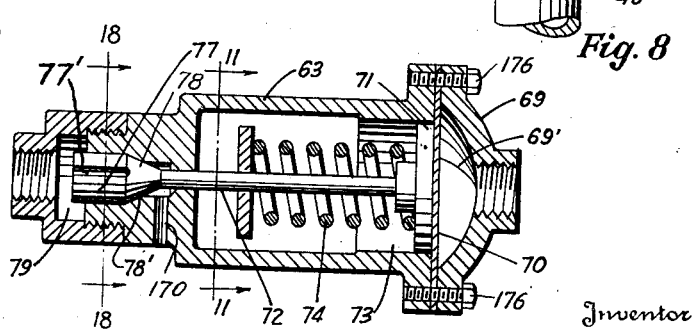
Inventor
Jeddy D. Nixon
By Jack Ashley
Attorney

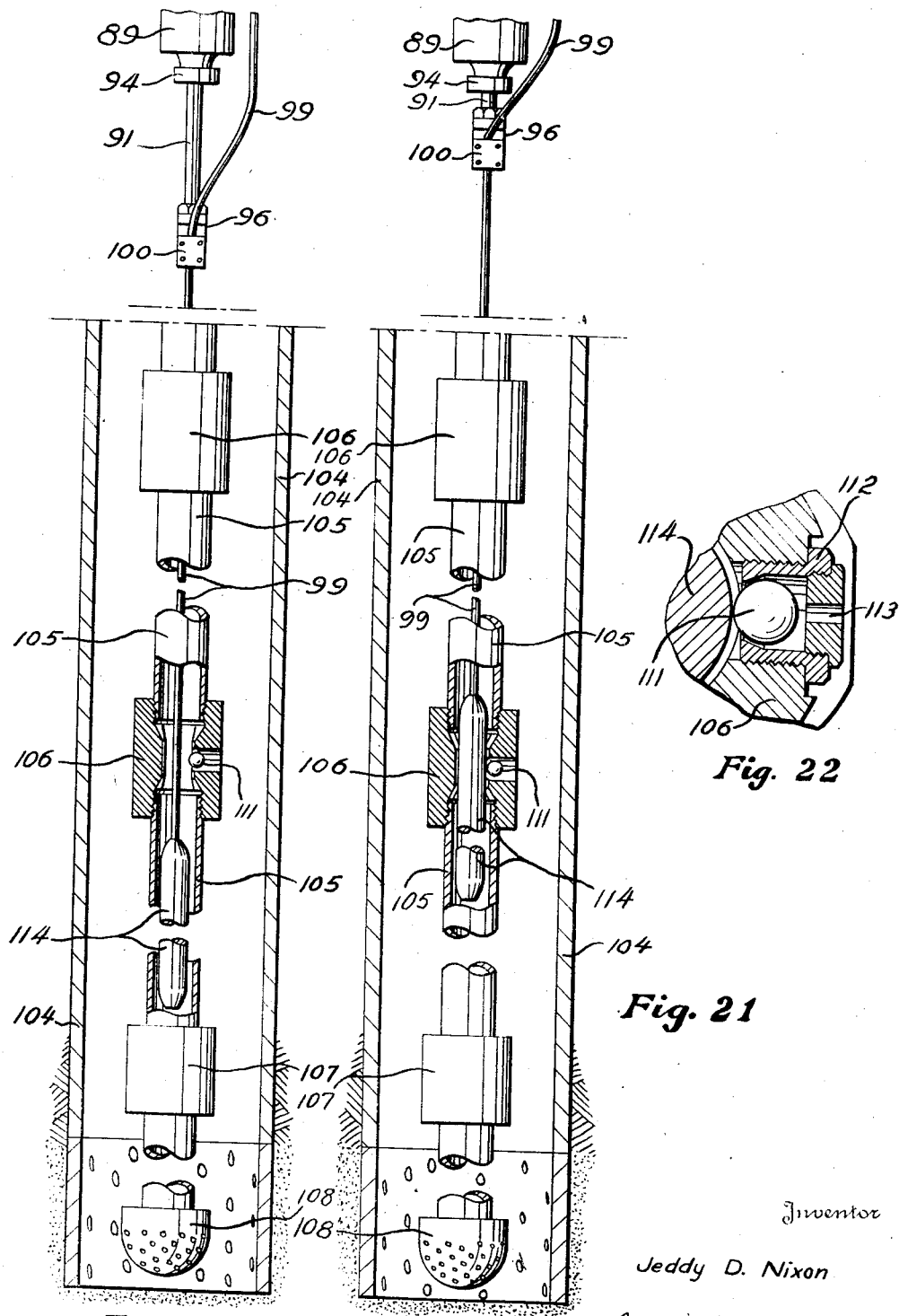

Patented Sept. 5, 1939

2,171,812

UNITED STATES PATENT OFFICE 2,171,812

MEANS FOR INTERMITTENT FLUID CONTROL DEVICES

Jeddy D. Nixon, Houston, Tex., assignor of one-half to Wilson Supply Company, Houston, Tex., a corporation of Texas Substituted for abandoned application Serial No. 117,103, December 21, 1936. This application November 17, 1938, Serial No. 241,040

15 Claims. (Cl. 103—232)

This invention relates to new and useful improvements in means for intermittent fluid control devices.

This application is filed as an improvement on my co-pending application, filed February 1, 1937, Serial Number 123,444, which has subsequently matured into Patent Number 2,132,081, and as a substitute for my abandoned application Serial No. 117,103 filed December 21, 1936.

One object of the invention is to provide an improved automatic intermittent control device for controlling the flow of fluids and arranged so that it may be regulated to produce a discharge given quantities of fluid, or control the flow of a fluid, at predetermined or designated intervals without the attendance of an operator; and which device, if desired, may be made portable.

Another object of the invention is to provide a device of the character described, wherein the fluid being controlled may be utilized as the operating force, or wherein an extraneous pressure fluid may be employed.

A particular object of the invention is to provide an intermittent control device having means for automatically cutting off the flow of the controlled fluid, when the latter reaches a predetermined point or elevation.

A further object of the invention is to provide an improved system of intermittent fluid control which consists in, accumulating a pressure fluid until a desired pressure is reached, leading the pressure fluid to suitable controls for regulating the flow of a controlled fluid, and when the controlled fluid is flowing the operation of the controls is discontinued, so that the flow of said controlled fluid is terminated.

Another object of the invention is to provide an intermittent control device so arranged that its intermittent control elements will be caused to begin and stop operating, smoothly and without a sudden actuation or marked vibration, whereby the flow of the fluid will be steady and regular and excessive wear upon the equipment will be avoided.

Still another object of the invention is to provide a chamber for accumulating an operating fluid and building up the pressure of said fluid for actuating a control valve; together with means for metering the supply of fluid to said chamber, whereby the frequency of intermittent operation of the device is regulated.

Still another object of the invention is to provide an improved system of intermittent fluid control which consists in, providing a supply of pressure fluid, conducting a portion of the pressure fluid to an actuator to operate the same, accumulating the conducted pressure fluid until a predetermined pressure sufficient to operate the actuator is reached and then releasing the pressure fluid from the actuator.

A further object of the invention is to provide an improved system of intermittent fluid control which consists in, providing a supply of pressure fluid, conducting a portion of the pressure fluid to an actuator to operate the same, the actuator controlling the flow of a secondary fluid, the normal position of the actuator cutting off the flow of the secondary fluid, accumulating the conducted portion of said pressure fluid until a predetermined pressure sufficient to operate the actuator is reached, the operation of the actuator permitting the secondary fluid to flow, and the flowing of the secondary fluid releasing the pressure fluid from the actuator to permit the same to return to its normal position and cut off the flow of the secondary fluid.

A further object of the invention is to provide an improved system of controlling a well which consists in, providing a supply of pressure fluid for a well, a portion of the pressure fluid being bypassed to an intermittent control device, which at predetermined time intervals supplies said fluid to an actuator to operate the same, the actuator controlling the admission of pressure fluid to the well fluid in the well to lift said well fluid from said well, accumulating the bypassed portion of said pressure fluid until a predetermined pressure sufficient to operate the actuator is reached, and the flowing of the well fluid releasing the pressure fluid from the actuator to permit the same to return to its normal position and discontinue the flow of the well fluid by cutting off the admission of pressure fluid to said well fluid.

A construction designed to carry out the invention will be hereinafter described, together with other features of the invention.

The invention will be more readily understood from a reading of the following specification and by reference to the accompanying drawings, in which an example of the invention is shown, and wherein;

Figure 6 is a view, partly in section and partly in elevation of the actuator;

Figure 7 is a longitudinal, sectional view of the relief valve;

Figure 8 is a vertical, sectional view of the operating or control valve;

Figure 9 is a horizontal, cross-sectional view taken on the line 9—9 of Figure 8;

Figure 10 is a similar view taken on the line 10—10 of Figure 8;

Figure 11 is a vertical, cross-sectional view taken on the line 11—11 of Figure 7;

Figure 20 is a diagrammatic view, showing how the invention may be applied to a well and the flow valve in the well being closed;

Figure 21 is a similar view, showing how the flow valve is opened; and

Figure 22 is an enlarged, detail view of the inlet port of said flow valve.

Figure 1:
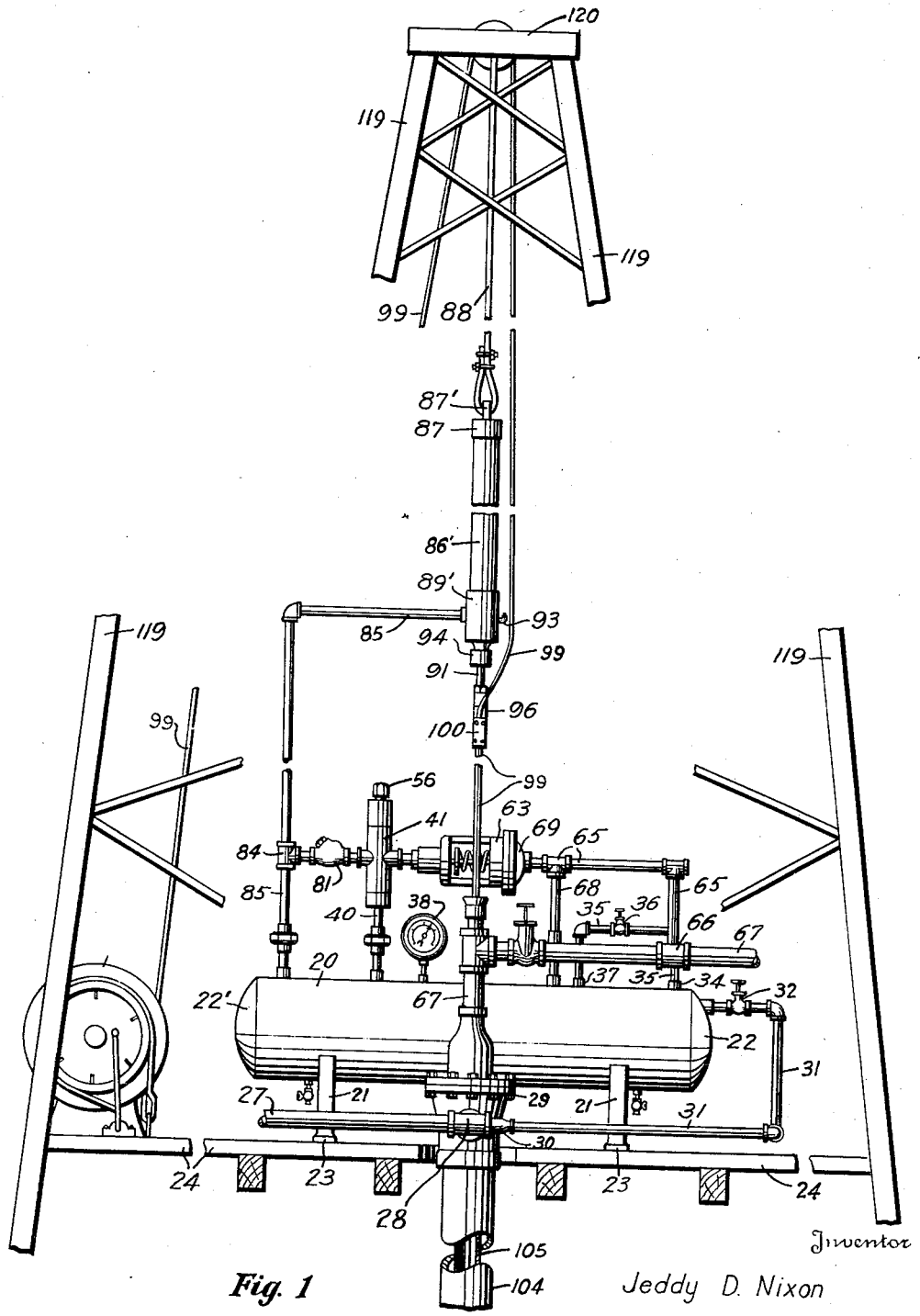
Figure 1 is an elevation of a device constructed in accordance with the invention, and shown as mounted on a well.

In the drawings, the numeral 20 designates a cylindrical, elongate tank mounted on standards 21, which have feet 23 that are adapted to rest upon a suitable support, such as a derrick floor 24 of a well. The ends of the tank 20 are closed by caps or heads 22 and 22' and the interior of said tank is provided with transverse, vertical partitions 25, which divide the tank into chambers A, B and C. Each chamber has a suitable drain outlet or pet cock 26 connected in its bottom.

While the invention has numerous uses and is not to be limited to any particular one, it has been found very satisfactory as a control for fluid lifts, such as are used to elevate well fluids. In explaining the invention, it will be described and illustrated in connection with such a lift. These fluid lifts use a pressure fluid to raise the well fluid by both displacement and by lifting.

In the installation shown in the drawings, the pressure fluid is supplied from a suitable source, (not shown) such as a compressor station or a gas well, to the well through a pipe 27 and a T 28. The pipe and T are connected to the usual casing head 29 mounted on the upper end of a well casing 104 and supporting the usual string of tubing 105. A swaged nipple 30 connects the T and a pipe 31, which pipe extends to the tank 20. As will be seen in Figures 1 and 4, the pipe 30 includes a suitable control valve 32 which is manually operated and said pipe is connected directly into the cap 22, so as to lead the pressure fluid from the pipe 27 into the chamber A.

The pressure fluid supplied to the tank by said pipe 27 may be the same as that supplied to the casing 104, or it may be an extraneous pressure fluid. At any rate, the chamber A will be filled with a pressure fluid at substantially the same pressure as is held in the pipe 27 and the casing 104. This chamber is provided with an outlet port 34 in which is threaded a pipe 35 having a suitable metering or needle valve 36 connected therein. The other end of the pipe 35 is connected into an inlet port 37 in the chamber B. The metering valve 36 is regulated so as to control the rate of feed or input of pressure fluid from the chamber A into the chamber B. Thus, it will be seen that the supply or feed of pressure fluid is positively controlled by the valve 36 and the time required to accumulate the necessary working pressure in chamber B may be varied by adjusting said valve. A suitable pressure gauge 38 is connected in the chamber B, so as to readily indicate the pressure therein, as well as the fluctuations of such pressure.

Figure 4:
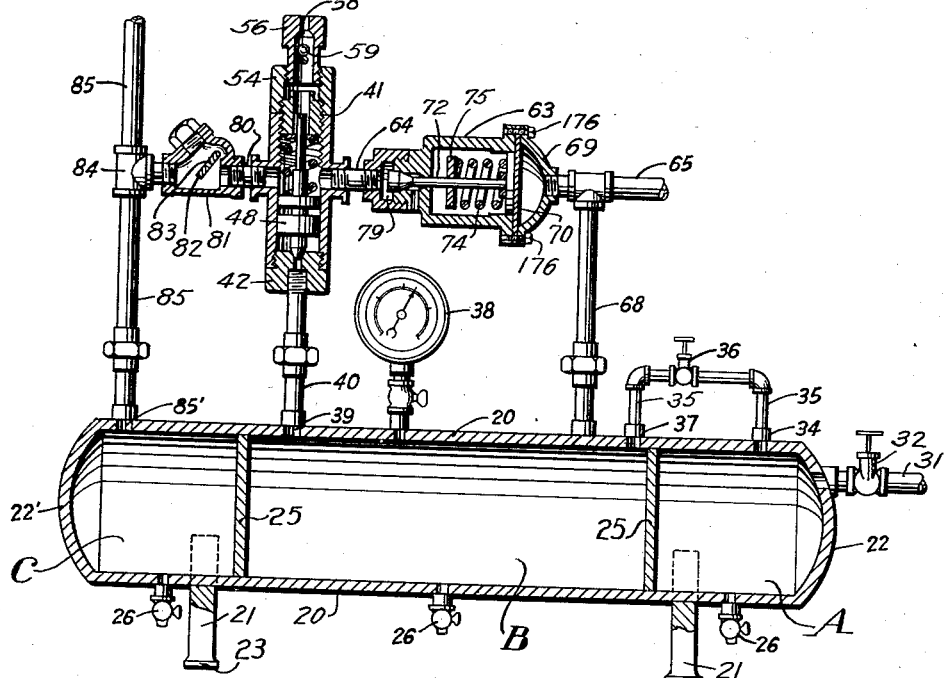
Figure 4 is a view, partly in section and partly in elevation, of the tank and the structures connected directly to it.
Figure 19:
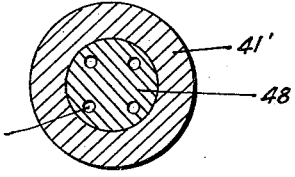
Figure 19 is a horizontal, cross-sectional view taken on the line 19—19 of Figure 8.

The chamber B is provided with an outlet port 39 in which is threaded the lower end of a short length of upright pipe 40 and the upper end of said pipe is connected into the lower end of an operating or control valve 41 (Figures 1, 4 and 8). The lower end of the valve case 41' is provided with a nipple 42, that is screw-threaded into said case and is provided with an axial bore or port 43, the upper end of which is countersunk so as to form an inclined, annular seat 44. A valve mandrel 45 slidable axially within the valve case, is provided with a depending stud or pin 46, having on its lower end a frustro-conical tip 47 for engaging in the inclined seat 44. Above the pin 46, an annular guide head or collar 48 is fastened on the mandrel and is provided with a plurality of ducts or ports 49 extending therethrough (Figures 8 and 19). The guide head 48 has a snug sliding fit within the valve case 41', which causes any fluid admitted to the pipe 40 to flow through the ports 49. A circular valve or shut-off disk 50 is fastened on the mandrel above said guide head and this disk also has a snug sliding fit within said valve case 41'.

This valve case is provided with a pair of outlet ports 61 and 62, intermediate its ends and preferably diametrically opposite each other. It will be seen that this disk 50 closes or shuts off the lower end of said valve case below said outlet ports and prevents the escape or passage of any fluid. It is particularly pointed out that said disk acts or serves as an equalizing valve, because the area of the under surface of said disk is so much greater than the lower end of the frustro-conical tip 47. When said disk is raised above the lower edge of the outlet ports 61 and 62, so as to permit the passage of the pressure fluid, the passage of said fluid pressure lifts said disk to a full open position and holds it there. It is pointed out that said disk will remain in this open position until the pressure of the fluid above and around said disk and that below the tip 47 are substantially equalized. The disk will remain in this open position for a sufficient length of time to permit the pipes 64, 80 and 85, the chamber C and the cylinder 86 beneath the plunger 89 to fill to substantially the same pressure as that above and around said disk, so as to move said plunger to its upper position (Fig. 6) with a slow and smooth action. When the pressure above and below said disk are substantially equalized and practically no more pressure fluid will flow from beneath said disk, then and only then will said disk move downwardly and close off the lower portion of said valve case 41'.

The valve mandrel 45 is enlarged just above the disk 50 and is then reduced to provide an upstanding, axial guide stem 51, which slidably engages within the axial bore 52 of a bushing 53. The bushing is screwed into the upper end of the bore of the valve case 41' and projects thereabove, so that an annular, elongated cap or head 54 may be screwed onto the upper portion of the bushing 53. It will be seen in Figure 8 that by removing the cap 54, said bushing may be adjusted vertically in the bore of the valve case.

A coil spring 55 is mounted between said bushing and said disk and surrounds the guide stem 51 and valve mandrel 45. Thus, it is pointed out that if said bushing is screwed further down into said valve case, the compression of the spring 55 is increased and all of the slidable valve parts therebelow are held in their lowermost positions (Figure 8) with increased force; and if said bushing were screwed upwardly in said valve case, the compression of said spring would be lessened, with a resultant reducing of the force exerted on said movable valve parts. The tension of said spring 55 controls the amount of pressure required in chamber B in order to open the tip 47 and disk 50, as well as to hold said tip and disk in a closed position until sufficient pressure is built up in the chamber B to overcome the tension of said spring.

The upper end of the cap 54 is provided with an axial, screw-threaded opening 54', into which is threaded a hexagonal, elongated cage 56 having a bore 57 extending axially thereof and counter-bored at its upper end to form a seat 58, from which a vertical port 58' extends. A ball valve 59 is mounted within the bore 57 of the cage 56 for engaging the seat 58 to form a pop valve. A pin 60 is inserted across the bore 57 of said cage, so as to limit the downward movement of said ball. It is pointed out (Figure 8) that said ball is of such size and so restricts the bore of said cage, that when suddenly subjected to a high fluid pressure, it will be lifted or carried up to the seat 58 and held there, so as to close the port 58' and prevent the escape of the pressure fluid from the valve case 41' to the atmosphere. However, there is sufficient clearance between the ball and the wall of the bore 57 to permit the passage of fluid around the ball, so that when the pressure and velocity of said fluid has been materially reduced, said ball 59 will fall and rest upon the pin 60, thereby permitting the escape of said pressure fluid from said valve case 41' to the atmosphere.

The outlet ports 61 and 62 (Figures 4 and 8) are internally screw-threaded, so that a short length of pipe 64 may be threaded into the port 61 and a short length of pipe 80 threaded into the port 62. The pipe 64 leads to one end of a diaphragm operated, relief valve 63 (Figures 4 and 10) and the other end of this valve is connected to a pipe 65, which extends to a T 66 connected in the well fluid flow line 67. The pipe 65 is supported by a standard 68 mounted on but not connected to the drum 20 and is threaded into a concavo-convex cap or head 69 (Figures 4 and 7) on one end of the valve cage 63. This cap confines a diaphragm 70 between said cap and one end of said valve cage, thus forming a chamber 69'. On the opposite side of the diaphram, a circular piston 71 mounted on a piston or valve rod 72 works within a cylinder 73. A suitable coil spring 74 surrounds said valve rod 72 and at one end bears against the piston 71, and at the other end against a retainer plate 75. This plate is provided with a pair of ears 75', which are slidable on a pair of rods or bolts 76 that are longer than the other bolts 176 holding the cap 69 on the valve cage 63. The bolts 76 are preferably screw-threaded throughout their length, so that the plate 75 may be adjusted on said bolts by the nuts 76' on each side of said plate.

Thus, it will be seen that with this arrangement, the compression of said spring 74 may be adjusted so as to compensate for variances in the pressure of the well fluid in the pipes 65 and 67. By regulating the compression on said spring, the piston may be actuated whenever desired; such as when only a portion of a charge of well fluid has passed the T 66; or when the major portion of a charge has passed said T; or if the well fluid has to be carried a long distance, which builds up a back pressure in the pipes 65 and 67, the spring 74 is adjusted so that the piston 71 will not be actuated, until the pressure fluid introduced into the casing 104 and the tubing 105 has lifted all of the charge of well fluid and begins building up a pressure in the T 66 and pipe 65 much greater than the above mentioned back pressure. It is pointed out that this spring may be readily adjusted to handle the necessary pressures exerted on the diaphram 70 and piston 71 from the pipe 65, in accordance with the various well conditions encountered.

The other end of the valve rod 72 is provided with a cylindrical head or boss 77 formed with an inclined valve face 78 on one end for engaging a complementary seat 78' in the chamber 79. The head 77 is provided with a plurality of longitudinal, external channels 77', which serve as passageways and said head protrudes into said chamber 79 in the end of the valve cage 63 adjacent the pipe 64. When said head 77 and valve face 78 are in their open position, the chamber 79 is open to the atmosphere through an exhaust port 170, so as to exhaust any fluid in the pipes 64 and 80, the valve cage 41' above the disk 50, the valve cage 56 and the chamber 79.

Figure 17:
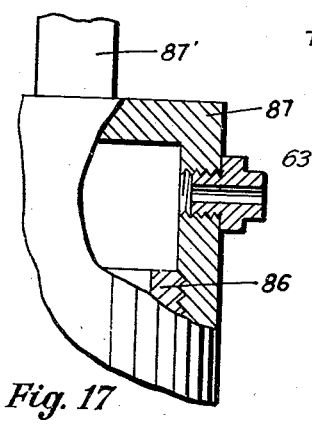
Figure 17 is a detail of the air vent of the actuator.
Figure 18:
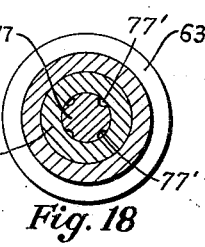
Figure 18 is a horizontal, cross-sectional view taken on the line 18—18 of Figure 7.

The pipe 80 is connected to a check valve 81, (Figures 1, 4 and 14) which has the usual flap 82 pivotally mounted therein. The flap 82 is provided with a small hole or bleed opening 83 extending therethrough, so that a small amount of fluid may escape through said hole when the flap is in its closed position. The other end of the check valve 81 is connected to a T 84 in an upright pipe 85. The lower end of this pipe 85 is connected to an inlet port 85' in the chamber C of the tank 20 for supplying pressure fluid to said chamber, which serves as a pressure cushion. The upper end of the pipe 85 is connected to the tubular housing or cylinder 86 of an actuator 86', (Figures 1, 6 and 17).

This cylinder is suitably suspended over the well, either in the usual drilling derrick 119 from the crown block 120 at the upper end of said derrick, or in a stub derrick made for this purpose, or in any other desired support. The upper end of the cylinder 86 is closed by a vented cap 87 having an upright ear 87' formed thereon, through which a loop of a cable 88 depending from the crown block 120 of the derrick 119, or other suitable support is inserted. A piston or actuator 89 having suitable piston rings or cups 90 thereon works within the cylinder 86 and is mounted on a piston rod 91 extending axially of said cylinder and out the lower end thereof. The lower end of said cylinder is provided with an elongated cap 89' having a transverse partition 92' forming a chamber 92 therebelow for containing a suitable lubricant, such a lubricating oil, and a filler pipe 93 is connected to said cap for said lubricant chamber. The lower end of the cap 89' carries a suitable stuffing box 94 containing packing 95, which surrounds the piston rod 91 to prevent the escape of said lubricant. The piston rod extends down through the partition 92', chamber 92 and out through said stuffing box.

Figures 12, 13, 14:
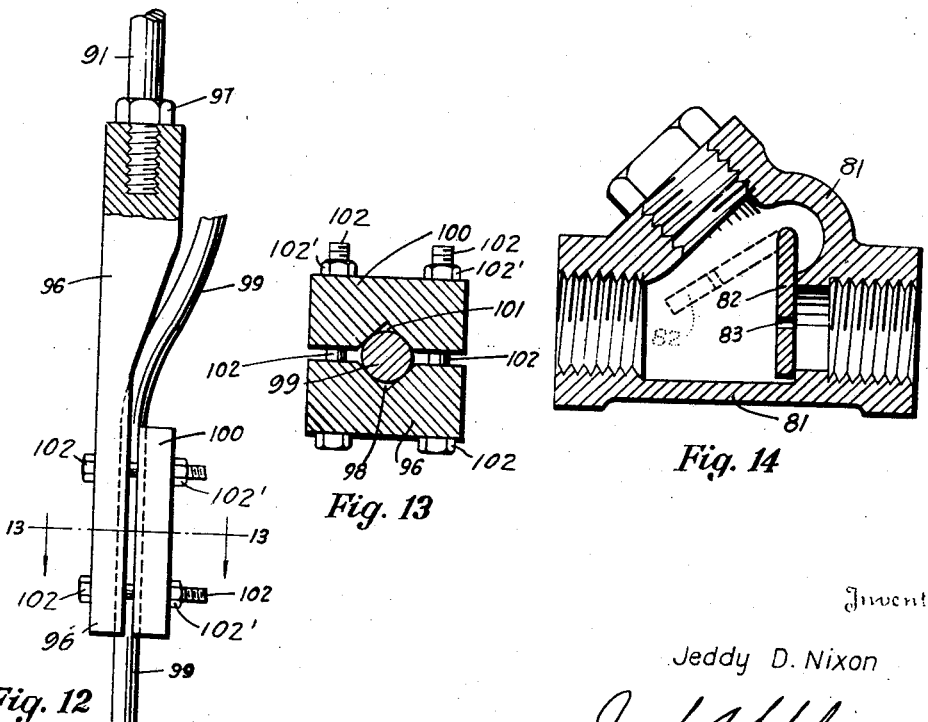
Figure 12 is a detail of the wire line clamp.
Figure 13 is a horizontal, cross-sectional view taken on the line 13—13 of Figure 12.
Figure 14 is a detail of the check valve.

The lower end of said piston rod is screwed into the upper end of an elongated wire line clamp 96 (Figures 6 and 12) and fastened therein by a lock nut 97. The lower portion of the clamp 96 is cut back, as is shown in Figure 12, and provided with an axial groove 98 (Figure 13); so that one side of a wire line, cable, or other element 99 may be imbedded in said groove. A clamping member 100 is fastened on to the lower end of said clamp by bolts 102 and nuts 102', as will be seen in Figures 12 and 13, and said member 100 has a complementary groove 101, whereby the opposite side of said wire line 99 may be imbedded therein. When the member 100 is fastened to the clamp 96, said wire line 99 will be securely clamped therein and any movement of said clamp will be transmitted to said wire line. Whenever pressure fluid is admitted to the cylinder 86 through the pipe 85, the piston 90 will be elevated therein and said piston rod 91 will carry said clamp 96 and wire line 99 therewith, whereby any device attached to said wire line will likewise be lifted. In Figure 1, it will be seen that the slack end of said wire line extends up over the sheaves of the crown block 120 on the upper end of the derrick 119, and then down to a suitable drum or hoist 103, as is the usual practice. It is preferred that the cylinder 86 be suspended coaxially with the tubing 105 of the well, thus assuring a vertical alinement.

As has been stated, the invention has been very successful in connection with the operation of a fluid lift for wells, but the invention is not to be limited to this particular use. In order to explain the invention and how it may be used with a fluid lift, I have illustrated a particular valve structure and a fluid lift, as set forth in the aforementioned patent and copending application Serial No. 123,444, filed February 1, 1937, now Patent 2,132,081, issued October 4, 1938. It is herewith pointed out that due to my invention, I have a positive and accurate control of a well and have been able to successfully and economically handle the well fluid with a fluid lift, as shown in the drawings. The casing 104 extends down into the well, as is the usual practice, and a string of tubing 105 is mounted within said casing (Figures 1, 3, 20 and 21). This string of tubing contains a plurality of flow valves 106, (Figures 3, 5, 15, 16, 20, 21 and 22) which are spaced in accordance with the conditions and circumstances surrounding the well. If desired, a suitable standing valve 107, or any other flow equipment may be mounted in the tubing string and on the lower end of said tubing it is more desirable to connect a perforated bull plug 108.

The flow valves 106 are shown as formed of elongated collars having an internal, cylindrical chamber 109 with a number of inwardly directed, guide ribs 110 extending thereinto and having their upper and lower ends beveled. A ball valve 111 is confined in a cage 112 screwed into the side of the valve 106. The cage has a fluid inlet port 113, whereby fluid may enter said tubing from said casing, so that the fluid level in said tubing will be above the ball valve 111 and will be the same as that in said casing.

Figures 3, 5:
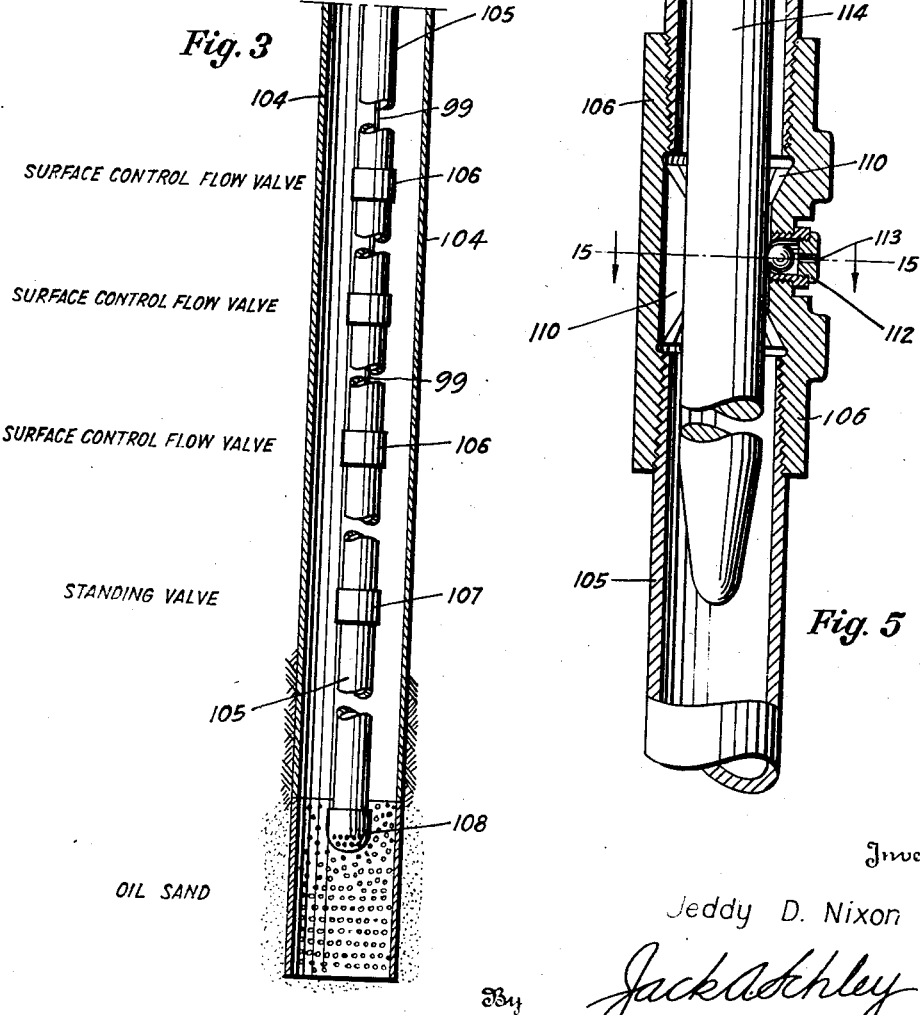
Figure 3 is a diagrammatic view, illustrating how the invention may be connected to a well for operating the same.
Figure 5 is a longitudinal, sectional view through one of the valves, and showing the actuating weight therein.
Figure 15:
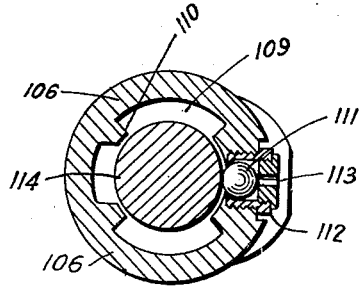
Figure 15 is a horizontal, cross-sectional view taken on the line 15—15 of Figure 5.
Figure 16:
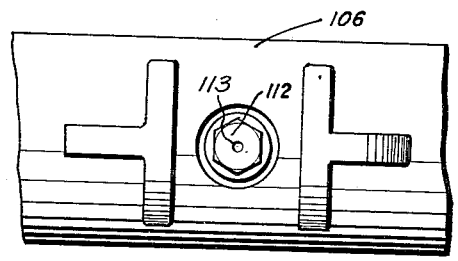
Figure 16 is an enlarged elevation of the valve, showing the inlet port thereof.

Whenever the pressure fluid in said casing encounters said ball valve 111, said valve will be seated and thus, close off said tubing from said casing at this point. It will be seen (Figures 5, 15, 20, 21 and 22) that when the ball 111 is seated, a portion thereof will protrude into the axial bore of said valve 106. A tripping weight bar 114 is fastened on the lower end of the wire line 99 and has its lower end pointed, so that it will more readily descend in said tubing and enter the valves 106. The upper end of this weight is reduced, in order that said weight also may readily enter the valves upon the upward travel thereof. When said weight bar 114 is lowered into or raised out of said valve 106, the guide ribs 110 will center said weight in the bore of said valve and this weight is of such diameter, as to engage the ball valve 111 and force the same from its seat in the cage 112 (Figures 5, 15 and 22). In this position, communication is established between said casing and said tubing at this point, so that the pressure fluid in said casing 104 may flow into said tubing 105. When said weight is lifted or lowered out of said valve 106, the ball valve 111 will be released by said weight and the flow of pressure fluid through said cage will seat said ball valve and hold it closed, whereby the elevation of fluid in said tubing from this point is terminated.

In operation, the fluid level of the well, on which a fluid lift and the intermittent control device are to be installed, is ascertained and the tubing string 105 is lowered into said well. In accordance with the fluid level and other well conditions, the bull plug 108 or a screen (not shown) of the desired length is screwed onto the lower end of said tubing string, then the standing valve 107 is connected in said tubing and said tubing string made up in the usual manner. The desired or necessary number of flow valves 106 are inserted in said tubing string, in accordance with the above mentioned conditions of said well. After said tubing is made up and suspended within said casing from the casing head 29, the weight bar 114 on the lower end of the wire line 99 is lowered into said tubing. The movement of the wire line, at this time, is controlled by the hoist 103. This weight bar may be lowered into the uppermost flow valve, or whichever one it is desired to operate.

This uppermost valve is usually set below the standing level of the well fluid and when said weight bar is suspended in said valve, (Figure 5) said ball valve 111 will be held off its seat in the cage 112 (Figures 15 and 22). The pressure fluid introduced into the upper end of said casing, through the casing head 29 from the T 28 and pipe 27, will be above the standing level of said well fluid in said casing. The pressure fluid will force said well fluid through the inlet port 113 of the opened valve cage 112 around the ball 111 and into said tubing. As the level of said well fluid in said casing recedes, due to the forcing of said well fluid into said tubing, the level or column of well fluid in said tubing rises. When the level of well fluid in said casing reaches the opened valve cage 112, the pressure fluid will flow into said tubing around said ball valve 111 and cut off the column of well fluid in said tubing at this point into a charge of well fluid. This charge of well fluid will be lifted up and out of said tubing through the flow line 67 to a separator, or other suitable disposal (not shown). If only one flow valve is used, then said weight bar is lowered out of said valve to a position, as shown in Figure 20 which is a short distance below said valve, and the wire line clamp 96 is fastened around said wire line 99 so as to securely hold the same. The intermittent control device is now ready for actuation and controls the movement of the wire line instead of the hoist 103. However, if it is desired or necessary to use more than one flow valve, or the well has to be produced from a lower level, then the weight bar is lowered by means of the hoist to the next valve, where the same operation occurs that has been set out above for the uppermost valve. When the desired level and valve is reached, the wire line 99 is attached as has been described and the use of the hoist 103 is discontinued.

Figure 2:
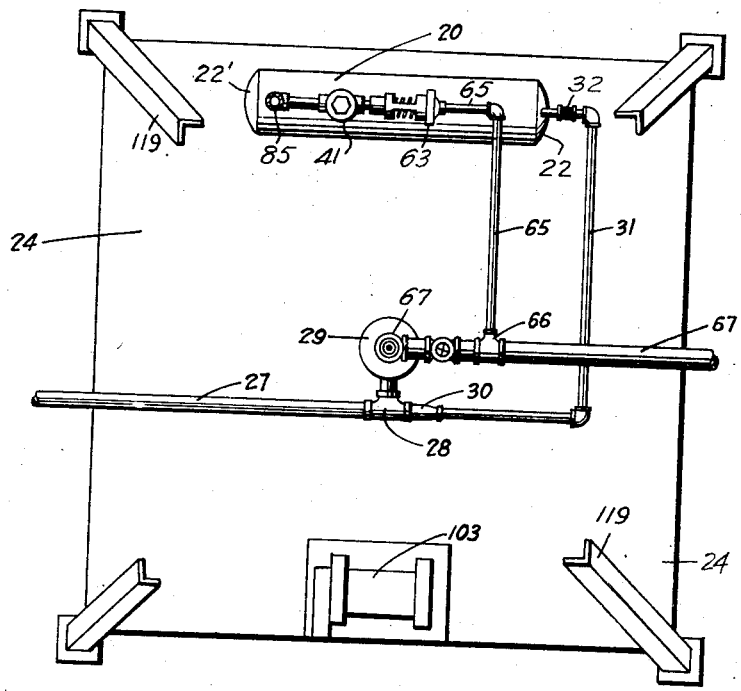
Figure 2 is a plan view.

Pressure fluid is supplied to the pipe 31 from the T 28 and pipe 27, and is led by said pipe 31 through the valve 32, which has now been opened, into the chamber A of the tank 20, so that said chamber will be filled with approximately the same pressure as contained in the pipes 31 and 27 (Figures 1 and 2). However, the pressure fluid supplied to the chamber A may be any extraneous fluid of sufficient pressure to operate the control device and lift the piston 90, wire line 99 and weight 114. The pressure fluid in the chamber A will flow therefrom into the pipe 35 and the metering valve 36 is regulated, so as to control the flow of the pressure fluid through the pipe 35 into the chamber B. The time required to build up the predetermined pressure in the chamber B, will be governed entirely by the rate of flow through the valve 36 and the compression of the spring 55 in the valve case 41'.

When the pressure of the fluid within said chamber B reaches a predetermined degree, which is sufficient to overcome the compression of said spring 55, the frustro-conical tip 47 will be raised from the inclined seat 44 and permit the pressure fluid to flow from the chamber B through the pipe 40 and passage 43 into said valve case 41'. This pressure fluid will pass through the openings 49 in the guide head 48 and act upon the disk 50 to increase the speed of opening of said valve. As soon as the disk 50 rises above the outlet ports 61 and 62, said pressure fluid will immediately fill said valve case and close the upper end thereof, by raising the ball 59 and holding it against its seat 58. Said pressure fluid will also enter the pipe 64 and chamber 79, as well as the pipe 80, the check valve 81, the T 84 and the pipe 85. The valve 78 being normally seated, which closes the duct 170, the pressure fluid will flow down the pipe 85 into the chamber C, as well as up the pipe into the cylinder 86 beneath the piston 89. The chamber C serves as a cushioning chamber, so as to prevent the full force of said pressure fluid from entering said cylinder and moving said piston upwardly too suddenly.

As soon as the pressure of the fluid on each side of the disk 50 becomes sufficiently balanced, the spring 55 will close said valves 50 and 47. However, this pressure will not equalize or balance on each side of said disk until the pipes 54, 80 and 85, the chamber C and the cylinder 86 beneath the piston 89 have filled with the pressure fluid to a pressure substantially equal or to within a few pounds differential to the pressure within the chamber B. When this valve 41 has closed, the pressure within the chamber B will again build up to a point where it will kick or operate the valve 41.

It is particularly pointed out that with the arrangement shown in the drawings, the piston will be moved upwardly smoothly and gradually and the rod 91 carried therewith. As has already been pointed out, said piston rod may be connected to any suitable device desired and when said rod is raised, said device may be actuated, or the operation thereof may be discontinued, depending entirely on the device and how it is connected to said rod. Inasmuch as applicant has shown the invention used with a well fluid lift, the lower end of said rod is connected to the wire line 99 by means of the wire line clamp 96 thereon (Figures 6, 12 and 13). Upon upward movement of said rod 91 and piston 89, the weight bar 114 on the lower end of said wire line will be lifted or raised into the flow valve 106 (Figure 21). It is pointed out that said weight bar was positioned a short distance below said flow valve before said wire line was clamped to said rod, as shown in Figure 20.

As has been pointed out, when said weight bar is in one of said flow valves (Figures 5, 15, 20 and 22), the valve cage 112 therein is open and the pressure fluid in said casing will enter said flow valve and cut off the column of well fluid in said tubing and said valve. The pressure fluid entering said valve will lift this cut off charge or "slug" of well fluid up and out of said tubing and into the flow line 67. The lifted charge of well fluid flowing through said flow line will also pass through the T 66 into the pipe 65 and chamber 69' formed by the cap 69 on the relief valve 63. The fluid will distort the diaphragm 70 and move the piston 71 in the cylinder 73, which slides the piston rod 72 (Figures 4 and 7) to the left and the valve 78 off its seat 78'. This permits the longitudinal channels 77' of the valve head 77 to open the chamber 79 to the atmosphere through the port 170. As soon as this chamber is opened, said chamber, the pipe 64, the valve body 41' and the pipe 80 will be emptied of pressure fluid and the check valve 81 securely closed. The ball 59 will drop down onto the pin 60, as shown in Figure 8, and the pressure fluid in the cylinder 86', pipe 85, T 84 and chamber C will begin to bleed through the small opening 83 in the pivoted flap 82 of said check valve. This pressure fluid bleeding through the opening 83 will flow into the valve case 41' above the disk 50, through the bore 57 of the valve cage 56, around the ball valve 59 and out of the port 58'. Inasmuch as the gas is flowing or escaping out of the port 58' at a greatly reduced pressure, said ball 59 will not be picked up and carried onto its seat 58.

After the passage of the charge of well fluid in the flow line 67, the chamber 69' will be drained or at least the pressure therein reduced, so that said spring 74 may return the diaphragm 70 and piston 71 to their original positions (Figures 4 and 7) and close the valve 78. As the pressure fluid in the cylinder 86, the chamber C, the pipe 85 and the T 84 escapes through the port 58' of the cage 56 on the upper end of the valve case 41', the piston 89 and rod 91 are lowered, as well as the wire line 99 and weight bar 114. Thus, said bar is again lowered out of said flow valve 106 to the position shown in Figure 20, which closes said valve and prevents the entrance of additional pressure fluid from said casing 104 until said valve is again opened. It is particularly pointed out that the pop valve 56 serves an additional purpose to that described, which is as a leak valve between operating periods. Any pressure fluid escaping from chamber B into the valve case 41', past the tip 47 and disk 50, will escape through the valve cage 56 instead of filling the chamber C, pipe 85 and cylinder 86, and thereby lifting the piston 89. Thus, this valve cage 56 will prevent the weight bar 114 from being pulled up into the flow valve 106 and prematurely actuating the fluid lift.

The device is now ready for another operation and as soon as the pressure fluid builds the predetermined pressure in the chamber B, the above operation of the intermitter will be repeated. While this particular valve and fluid lift has been shown as connected with the intermittent control device, I use this fluid lift and valve to constantly flow the well without the intermitter. The valve 32 is either closed or the intermitter is not even connected.

What I claim and desire to secure by Letters Patent is:

1. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for regulating the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into the conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, means for controlling the operation of said valve within predetermined limits, and a release valve connected with said controlling valve and said conduit and having a diaphragm exposed to the secondary fluid and arranged to be operated by the pressure of said secondary fluid to release said pressure fluid from said control valve and said cylinder.

2. An intermittent control device for controlling the flow of a secondary fluid including, a conduit for the secondary fluid being controlled, a pressure fluid supply inlet, a pressure fluid reservoir for supplying pressure fluid, a pressure fluid accumulating chamber, a conductor connecting said reservoir with said chamber for conducting the pressure fluid from said inlet to said chamber, a metering device for regulating the flow of pressure fluid through said conductor, a cylinder having an air vent and an inlet opening therein, a pressure fluid operated plunger slidable within said cylinder and operated by the pressure fluid from said accumulating chamber, means in said conduit for admitting pressure fluid into the conduit, a control member connected to and operated by said plunger for controlling said pressure fluid admitting means to control the flow of said secondary fluid, a valve connected with said accumulating chamber and said cylinder for controlling the supply of pressure fluid to said cylinder through said inlet opening, said valve being so arranged as to be actuated by a predetermined pressure of fluid within said chamber, a fluid cushioning chamber connected with said control valve and said cylinder to cushion the flow of pressure fluid to said cylinder, whereby the operation of said plunger is smooth and relatively slow, a check valve having a small bleed opening therein and connected to said control valve between said valve and said cushioning chamber and cylinder, and a release valve connected with said controlling valve and said conduit and having a diaphragm exposed to the secondary fluid and arranged to be operated by the pressure of said secondary fluid to release the pressure fluid from said control valve and said cylinder.

3. A control unit for a pressure fluid flowing apparatus for controlling the flow of a secondary fluid including, a conduit for the secondary fluid being controlled, a pressure fluid supply inlet, a pressure fluid accumulating chamber, a conductor connecting said inlet with said chamber for conducting the pressure fluid from said inlet to said chamber, means for regulating the flow of pressure fluid through said conductor, pressure fluid responsive means for reducing said pressure fluid in said chamber when a predetermined pressure has accumulated in said chamber, an actuator connected to said responsive means and operated by the pressure fluid released from said chamber, means in said conduit for admitting pressure fluid into the conduit, a control member connected to said actuator for controlling said pressure fluid admitting means to control the flow of said secondary fluid and operated by said actuator, and means including an element exposed to said secondary fluid arranged to be operated by the pressure of said flowing secondary fluid for releasing the pressure fluid from said actuator.

4. A control unit for a pressure fluid flowing apparatus for controlling the flow of a secondary fluid including, a conduit for the fluid being controlled, a pressure fluid supply inlet, a pressure fluid accumulating chamber, a conductor connecting said inlet with said chamber for conducting the pressure fluid from said inlet to said chamber, means for controlling the flow of pressure fluid through said conductor, pressure fluid responsive means for reducing said pressure fluid in said chamber when a predetermined pressure has accumulated in said chamber, an actuator connected to said responsive means and operated by the pressure fluid released from said chamber, means in said conduit for admitting pressure fluid into the conduit, a control member connected to said actuator for controlling said pressure fluid admitting means to control the flow of said secondary fluid and operated by said actuator, and means including an element exposed to said secondary fluid arranged to be operated by the pressure of said flowing secondary fluid for releasing the pressure fluid from said actuator, and cushioning means connected to said pressure responsive means and said actuator so when said responsive means is actuated the flow of pressure fluid from said chamber is cushioned so that the operation of said actuator is smooth and steady.

5. An intermittent control device for controlling the flow of an extraneous fluid including a flow conduit for the fluid being controlled, a pressure fluid supply inlet, a pressure fluid accumulating chamber, means for feeding pressure fluid from said inlet to said chamber, pressure fluid actuated means connected to said chamber and actuated by the pressure fluid accumulated in said chamber, means for regulating the feed of pressure fluid to said chamber to control the frequency of operation of said pressure actuated means, a valve in said actuated means for controlling the supply of pressure fluid from said chamber to said actuated means, means in said conduit for admitting pressure fluid into the conduit, controlling means having a fluid pressure connection with said actuated means and operated by the pressure fluid released from said chamber by said actuated means for controlling said pressure fluid admitting means to control the flow of said extraneous fluid through said conduit, cushioning means connected to said pressure actuated means and said controlling means so that when said pressure actuated means is actuated the flow of said pressure fluid from said chamber is cushioned and the operation of said actuator is smooth and steady, and means arranged to be operated by the flow of said extraneous fluid in said conduit for releasing said pressure fluid from said control means and said pressure actuated means.

6. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, a metering device connected to said feeding means for regulating the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid in said conduit, and means actuated by said extraneous fluid for releasing said pressure fluid from said valve and said cylinder when said extraneous fluid is flowing.

7. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, a metering device connected to said feeding means for regulating the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid in said conduit, means for controlling the operation of said valve within predetermined limits, and means actuated by said extraneous fluid for releasing said pressure fluid from said valve and said cylinder when said extraneous fluid is flowing in said conduit.

8. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, a metering device connected to said feeding means for regulating the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid, and means actuated by the flow of said extraneous fluid for releasing said pressure fluid from said valve and said cylinder when said extraneous fluid is flowing in said conduit, fluid cushioning means connected to said cylinder and said valve so when said valve is actuated by said pressure fluid in said chamber the flow of said pressure fluid from said valve is cushioned so that the operation of said plunger is smooth and steady.

9. An intermittent control device for controlling the flow of an extraneous fluid including a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, a metering device connected to said feeding means for regulating the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid, and means for releasing said pressure fluid from said valve and said cylinder when said extraneous fluid is flowing comprising a diaphragm valve connected with said control valve and said cylinder and arranged to be operated when exposed to a predetermined pressure of said extraneous fluid.

10. An intermittent control device for controlling the flow of an extraneous fluid including, a conduit for said extraneous fluid, a pressure fluid supply inlet, a pressure fluid accumulating chamber for receiving pressure fluid from said fluid inlet, means for feeding pressure fluid from said inlet to said chamber, a spring-loaded valve connected to said chamber and actuated by the pressure fluid accumulated in said chamber, a cylinder connected to said valve, a pressure fluid operated plunger in said cylinder and actuated by said pressure fluid released from said chamber by said valve, a metering device connected to said feeding means for regulating the feed of pressure fluid to said chamber to control the frequency of operation of said valve and said plunger, means in said conduit for admitting pressure fluid into the conduit, a control member connected to said plunger and actuated thereby for controlling said pressure fluid admitting means to control the flow of said extraneous fluid, and means for releasing said pressure fluid from said valve and said cylinder when said extraneous fluid is flowing, comprising a diaphragm valve connected with said control valve and said cylinder and arranged to be operated when exposed to a predetermined pressure of said extraneous fluid, and fluid cushioning means connected to said cylinder and said valve so when said valve is actuated by said pressure fluid in said chamber the flow of said pressure fluid from said valve is cushioned so that the operation of said plunger is smooth and steady.

11. An intermittent control device for controlling the flow of a secondary fluid including, a flow conduit for said secondary fluid, a pressure fluid reservoir for supplying pressure fluid, a pressure fluid accumulating chamber for receiving pressure fluid, a flow pipe connecting said chamber with said reservoir, a metering device connected in said pipe for regulating the flow pressure fluid through said pipe to control the accumulation of pressure fluid in said chamber, a spring loaded valve connected to said chamber for receiving pressure fluid from said chamber and arranged to be actuated by the pressure fluid accumulated in said chamber, a cylinder connected to said valve, a pressure fluid operated plunger slidable in said cylinder and actuated by said pressure fluid released from the chamber by said valve, a cushioning chamber connected to said valve and said cylinder for receiving a portion of the flow of pressure fluid from said valve so that the operation of said plunger in said cylinder will be smooth and relatively slow, means in said conduit for admitting pressure fluid into the conduit, a control member connected to said plunger and actuated thereby for controlling said pressure fluid admitting means to control the flow of said secondary fluid through said conduit, and means including an element exposed to and arranged to be operated by the flowing of said secondary fluid for releasing said pressure fluid from said cylinder to permit said plunger to return to its normal position.

12. A system of controlling the flow of an extraneous fluid which includes, a flow conduit for said extraneous fluid, a flow pipe for supplying a fluid under pressure, means connected in said pipe for regulating the flow of said pressure fluid through said pipe, means for accumulating said pressure fluid from said pipe, means connected to said accumulating means and intermittently actuated by the pressure of said accumulated pressure fluid for reducing the pressure of said pressure fluid in said accumulating means, pressure fluid actuated means connected to said reducing means and operated by the pressure fluid released from said accumulating means, means in said conduit for admitting pressure fluid into the conduit, a control member connected to said pressure fluid actuated means and operated thereby for controlling said pressure fluid admitting means to control the flow of the extraneous fluid, and means for releasing the pressure fluid from said actuated means, said release means being operated by the flow of said extraneous fluid.

13. A system of controlling the lifting of well fluid which includes, a well, a flow conduit in said well, a flow conductor for supplying a pressure fluid to said well, a flow pipe connected to said conductor, means connected in said pipe for regulating the flow of said pressure fluid through said pipe, means for accumulating said pressure fluid from said pipe, means connected to said accumulating means and intermittently actuated by the pressure of said accumulated pressure fluid for reducing the pressure of said pressure fluid in said accumulating means, pressure fluid actuated means connected to said reducing means and operated by the pressure fluid released from said accumulating means, means in said conduit for admitting pressure fluid into the conduit, control means in said flow line connected to said pressure fluid actuated means and operated thereby for controlling said pressure fluid admitting means to control the admission of pressure fluid in said well to said flow conduit, and means for releasing the pressure fluid from said actuated means, said means being operated by the flow of said well fluid in said flow conduit.

14. A system of controlling the lifting of well fluid which includes, a well, a flow line in said well for providing a column of well fluid, means for supplying a pressure fluid to said well, means for controlling the admission of pressure fluid to said column of well fluid, a flow conduit connected to said supply means for by-passing a portion of said pressure fluid, means connected in said conduit for regulating the flow of said pressure fluid through said conduit, means for accumulating said pressure fluid from said conduit, means connected to said accumulating means and intermittently operated by the pressure of said accumulated pressure fluid for reducing the pressure of said pressure fluid in said accumulating means to set up a pressure differential for a predetermined period of time to actuate said pressure fluid admission controlling means for said column of well fluid to flow said well fluid, and means connected to said flow line and actuated by the pressure of the flowing well fluid for releasing the pressure fluid from said reducing means whereby to cut off the admission of said pressure fluid to said column of well fluid.

15. A system of controlling the lifting of well fluid which includes, a well, a flow line in said well for providing a column of well fluid, means for supplying a pressure fluid to said well, means for controlling the admission of pressure fluid to said column of well fluid, a flow conduit connected to said supply means for by-passing a portion of said pressure fluid, means connected in said conduit for regulating the flow of said pressure fluid through said conduit, means for accumulating said pressure fluid from said conduit, means connected to said accumulating means and intermittently operated by the pressure of said accumulated pressure fluid for reducing the pressure of said pressure fluid in said accumulating means to set up a pressure differential for a predetermined period of time to actuate said pressure fluid admission controlling means for said column of well fluid to flow said well fluid, means connected to said flow line and actuated by the pressure of the flowing well fluid for releasing the pressure fluid from said reducing means, whereby to cut off the admission of said pressure fluid to said column of well fluid, and cushioning means connected to said accumulating means and said pressure fluid admission actuating means so that when said reducing means is actuated by the pressure fluid in said accumulating means the flow of said pressure fluid therefrom is cushioned so that the operation of said admission controlling means is smooth and relatively slow.

JEDDY D. NIXON.